US012711134B1

(12) United States Patent
Gupta et al.

(10) Patent No.: US 12,711,134 B1
(45) Date of Patent: Aug. 18, 2026

(54) AGENTIC WORKFLOW FOR LANGUAGE MODEL POWERED SEARCH AND VISUALIZATION ON STRUCTURED AND UNSTRUCTURED DATA

(71) Applicant: Schlumberger Technology Corporation, Sugar Land, TX (US)

(72) Inventors: Akshay Gupta, Pune (IN); Omkar Anil Gune, Pune (IN); Prashanth Pillai, Pune (IN); Purnaprajna Raghavendra Mangsuli, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/248,554

(22) Filed: Jun. 25, 2025

(30) Foreign Application Priority Data

Apr. 29, 2025 (IN) ............................ 202511041432

(51) Int. Cl.
*G06F 16/00* (2019.01)
*G06F 16/2453* (2019.01)

(52) U.S. Cl.
CPC .............................. *G06F 16/24542* (2019.01)

(58) Field of Classification Search
CPC ................................................ G06F 16/24542
USPC ........................................................ 707/718
See application file for complete search history.

(56) References Cited

U.S. PATENT DOCUMENTS

2025/0371318 A1* 12/2025 Thompson, III ....... G06N 3/006

* cited by examiner

*Primary Examiner* — Chelcie L Daye
(74) *Attorney, Agent, or Firm* — Kyle R. Miiller

(57) ABSTRACT

An agentic system and method for answering a data query using a language model-based system includes performing operations that may include one or more of receiving a data query, interpreting the data query, determining an action plan for answering the data query, sending one or more calls to a set of tools, and receiving output from the tools. The operations may further include synthesizing the output from the tools to form a response to the data query and determining whether the response successfully answers the data query. If the response has not successfully answered the data query, the operations may include sending a call with intermediate steps of reasoning to improvise the action plan comprising query decomposition and tool calling. If the response has successfully answered the data query, sending a final answer based on the response to an end user.

20 Claims, 6 Drawing Sheets

AGENTIC WORKFLOW FOR LANGUAGE MODEL POWERED SEARCH AND VISUALIZATION ON STRUCTURED AND UNSTRUCTURED DATA

CROSS-REFERENCE TO RELATED APPLICATION

This application claims priority to and the benefit of Indian Application No. 202511041432, entitled "AGENTIC WORKFLOW FOR LANGUAGE MODEL POWERED SEARCH AND VISUALIZATION ON STRUCTURED AND UNSTRUCTURED DATA," filed Apr. 29, 2025, which is hereby incorporated by reference in its entirety for all purposes.

BACKGROUND

In the oil and gas industry, searching for information from both structured sources (e.g., OSDU Data Platform) and unstructured sources (e.g., scanned PDFs, Excel Sheets, Power Point Presentations) is a common task. The speed and accuracy of the search can impact decision making processes; thus, saving time and money. Recently, large language models (LLMs) have been used in providing solutions that can do a semantic search on the data from a natural language query. Tools have been developed using LLMs to perform natural language searches individually on different data sources. However, as the queries become more complex, both the structured and unstructured sources may be searched, sometimes even multiple times, to get the desired result. Further, the output from these sources may be combined or visualized to provide the final answer. The conventional tool specific approach to LLMs is inadequate in addressing such queries.

It may be desirable to provide an agentic, language-model based system configured to provide enhanced the capability to deal with complex queries as well as react to different failures and improvise in order to answer a data query.

SUMMARY

An exemplary agentic system and method may utilize a language model powered search and visualization on structured and unstructured data to answer a data query. In some embodiments, the system may be configured to perform operations including receiving, by an action planning node, a data query. The data query includes at least one of a natural language query, a conversational history, or user context.

In some embodiments, the system may be configured to interpret, by the action planning node, the data query to determine what information is needed to answer the data query. The system may, in some embodiments, be configured to determine, by the action planning node, an action plan for answering the data query. In some embodiments, the action plan may include how to decompose the data query into sub-queries and what actions are required to obtain the information for each of the sub-queries.

In some embodiments, the action planning node may include, or can access, at least one of a language model or a domain store of domain centric information. In some embodiments, the domain centric information may include at least one of ontological data, knowledge graphs, or vector databases.

In some embodiments, the system may be configured to send a call, by the action planning node, to an action node to execute a selected tool from a set of tools. In some embodiments, the selected tool may include a workflow configured to, at least one of, retrieve data from one or more databases or documents, transform the data, run domain interpretation workflows, or generate charts on the data.

In some embodiments, the system may be configured to send, by the action node, output from the selected tool to the action planning node. In some embodiments, the system may be configured to determine, by the action planning node, if additional information is needed to answer the data query. If the action planning node determines that additional information is needed, in some embodiments the system may be configured to send one or more additional calls, by the action planning node, to the action node to execute one or more selected tools from the set of tools and send, by the action node, output from the one or more selected tools to the action planning node.

In some embodiments, the system may be configured to synthesize, by a final node, the output from the selected tools to form a response to the data query and send the response to the data query to a gate node. In some embodiments, the system may be configured to determine, by the gate node, whether the response successfully answers the data query. In some embodiments, the gate node may include, or may access, a language model.

If the gate node determines that the response has not successfully answered the data query, in some embodiments, the system may be configured to send a call, by the gate node, back to the action planning node with intermediate steps of reasoning to improvise the action plan comprising query decomposition and tool calling and gather different or additional data. If the gate node determines that the response has successfully answered the data query, in some embodiments, the system may be configured to send a final answer based on the response to an end user. In some embodiments, the system may be configured to provide to display the final answer via a user interface.

In some embodiments, the system may be configured to receive, by an agent summarizer node, at least one of the final answer and the intermediate steps in reasoning and determine by the agent summarizer node, one or more insights from at least one of the action plan or the intermediate steps of reasoning. In some embodiments, the system may be configured to store the one or more insights into an insight store. In some embodiments, the system may be configured to enhance the action planning node by synthesizing examples and instructions using the one or more insights from the insights store. In some embodiments, the one or more insights may include one or more of outcomes from tool calls, query decomposition, or tool input arguments. In some embodiments, the insights store may include one or more of a vector database or a graph database.

In some embodiments, the workflow may be configured to retrieve data from one or more databases including retrieving data from at least one of a relational database, a non-relational database, a graph database, or a vector database.

In some embodiments, the system may be configured such that the intermediate steps in reasoning may include at least one of a sequence of tools calls, one or more subqueries from query decomposition, or one or more input arguments to one or more tools from the set of tools.

In some embodiments, the system may be configured such that the set of tools may include one or more of a document search tool configured to conduct a search of one or more unstructured data sources, a document summarization tool configured to summarize information within a document, a structured search and summarization tool configured to conduct a search of a structured data repository and summarize search results from the search, a get related data tool configured to determine parent and child entities for a specific record, a plotting tool configured to generate charts from results retrieved from at least one of the search of the structured data repository and the search of the one or more unstructured data sources, or a packaging tool configured to package the search results from the search of the structured data repository.

In some embodiments, the structured data repository may be an OSDU Data Platform.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

System Overview

Figure 1:
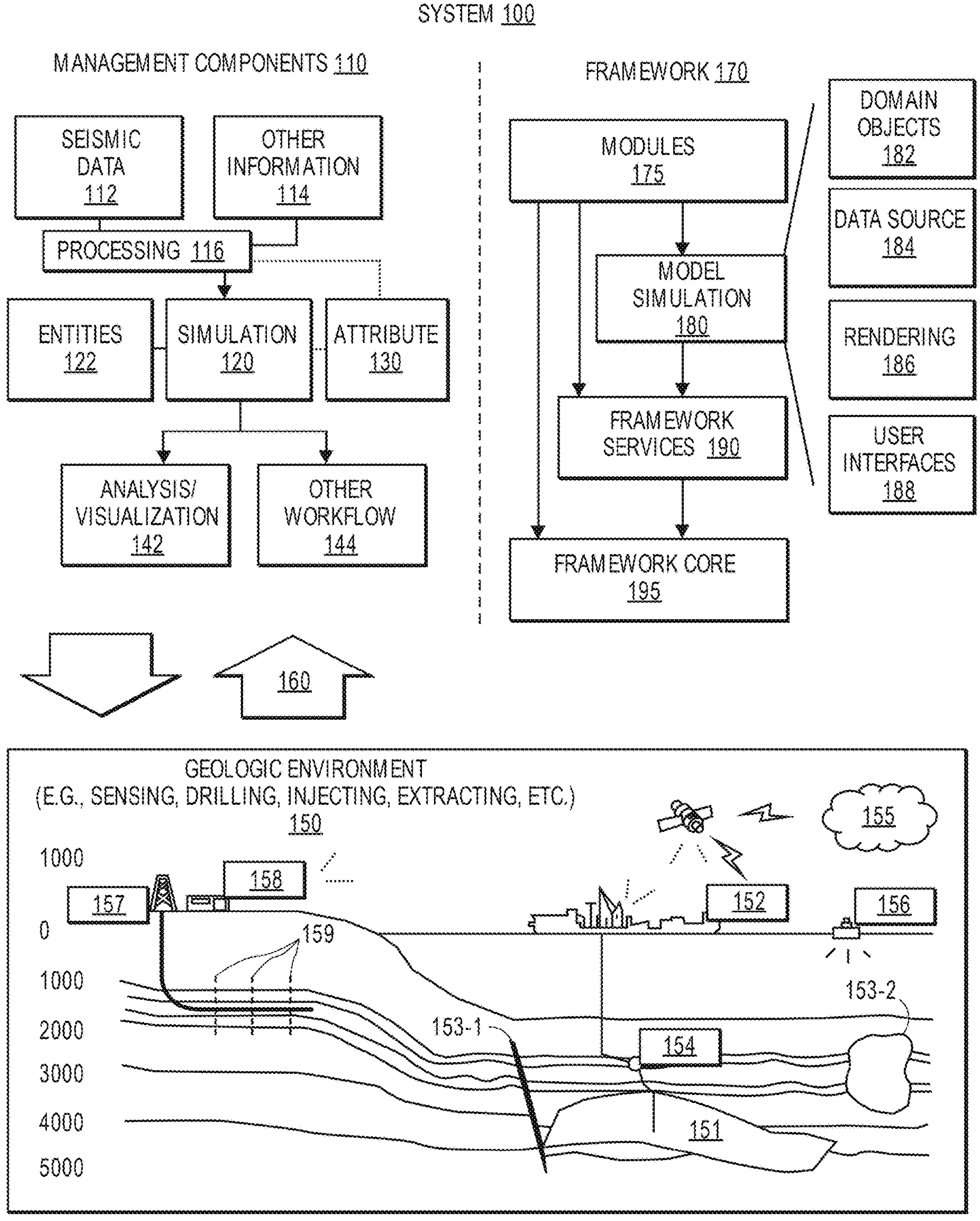
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (SLB, Houston Texas), the INTERSECT™ reservoir simulator (SLB, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (SLB, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (SLB, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Agentic Language Model-Based System and Method

The present disclosure introduces an agentic language model-based system and method for the searching and visualization of structured and unstructured data (e.g., for answering an oil and gas data query). In some embodiments, the system and method may use one or more language models, such as large language models (LLMs) and/or small language models (SLMs) applied in different personas. The language model-based system may include a graph-based architecture where both agent and tools are represented as nodes with directed edges based on the permissible action from each node. In some embodiments, the system framework may be configured to improvise on the existing non-agentic system(s) to handle complex queries which access multiple tools. In some embodiments, the system may be configured to be able to recover from a failure by exploring different trajectories. In some embodiments, the agentic system may minimize the use of hardcoded rules to direct the output of the workflow as the system delegates much of this responsibility to the agent. In some embodiments, the system may be configured to observe the results and improvise accordingly. In addition, in some embodiments, the system may be configured to improvise by allowing for dynamic returns as well as a gate node to ensure that the answer generated by the agent is satisfactory.

Figure 2:
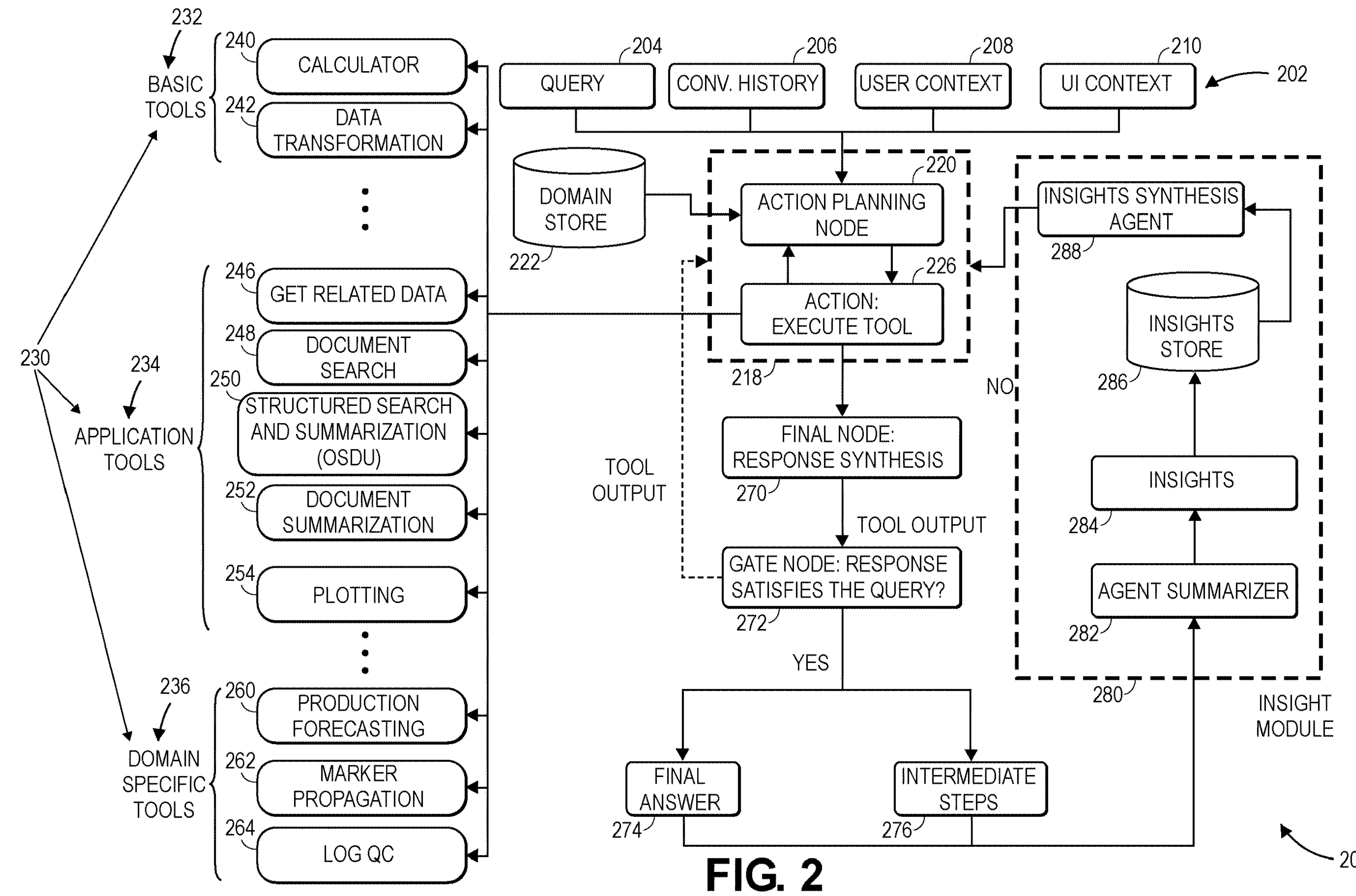
FIG. 2 illustrates a workflow of an example language model-based system configured to search information from both structured and unstructured data sources, according to an embodiment.

Agentic Workflow LLM-based Search and Visualization on Structured and Unstructured Data FIG. 2 illustrates an example workflow for an agentic language model-based system 200, according to the present disclosure, for the searching and visualization of structured and unstructured data. In some embodiments, the system may include one or more agents and one or more tools that are represented as nodes. The nodes may include directed edges based on the permissible action from each node.

Referring to FIG. 2, the system 200 may be configured to receive one or more inputs 202 associated with, or representative of, a data request or data query. The one or more inputs 202 may be configured in a variety of ways. In some embodiments, the one or more inputs 202 may include one or more of a natural language data query 204 (e.g., user query such as "Find the deepest well in the Kauri field"), a conversational history 206, user context 208 (e.g., persona, access control, user preference, etc.), or user interface (UI) context 210 (e.g., mouse position, what has been selected on the UI, which page of a document is open, etc.).

In some embodiments, the system 200 may include an action module 218. The action module 218 may include an action planning node or action planning agent 220 configured to process the one or more inputs 202 and form an action plan to resolve the data request or data query. In some embodiments, the action planning node 220 may include, or access, a language model (e.g., LLM or SLM). In some embodiments, the action planning node 220 may be configured to break down or decompose or break-up the data request or data query into subqueries and determine what actions are required to obtain the information for each of the subqueries. For example, in some embodiments, the action planning node 220 may interpret the query/subqueries and initiate or send a call to an action node 226 of the action module 218 invoking one or more external tools or specific functions (e.g., execute tool) allowing the language model to interact with external systems and perform actions such as retrieving data, executing calculations, etc.

To facilitate accurate query decomposition and agent/tool calling, in some embodiments, the action planning node 220 may have access to a domain source 222 of domain centric information. The domain source 222 may encode essential domain-centric conceptual information, past insights, ontology, etc. The domain centric information may be configured in a variety of ways. In some embodiments, the domain centric information may include, but not be limited to, one or more of ontological data, knowledge graphs, vector databases, relational databases, or graph databases. In some embodiments, the action planning node 220 may operate in a recursive fashion invoking multiple tools/agents based on the complexity of the data query. For example, recursive behavior may be used if the required information is not retrieved using a particular strategy of selecting a specific tool/agent.

In some embodiments, the action node 226 may be configured to access different agents/tools to solve each subquery. For example, the action node 226 may be configured to execute a selected tool from a set of tools 230. The set of tools 230 may include a wide variety of tools that can be executed to perform a wide variety of tasks, such as, but not limited to, retrieve data from one or more databases, transform the data, run domain interpretation workflows, or generate charts on the data. In some embodiments, the set of tools 230 may be hierarchical by nature, wherein the set of tools 230 may be organized hierarchically, with supervisor agents managing each category and a main agent interacting with the supervisor agents to coordinate the tool calling within each category. The main agent may be the same as or similar to the action planning node. In some embodiments, one or more tools of the set of tools 230 may function as react agents, capable of autonomous operation in response to the main agent's requests.

The set of tools 230 that the action node 226 can access may vary in different embodiments. In some embodiments, the set of tools 230 may be categorized by functionality. For example, in some embodiments, the set of tools 230 may include one or more basic tools 232, one or more application tools 234, and/or one or more domain specific tools 236. In some embodiments, the one or more basic tools 232 may include, for example, but not be limited to, a calculator tool 240, a data transformation tool 242, or other basic tools (e.g., tools that perform simple utilities). In some embodiments, the data transformation tool 242 may be configured to transform the data by, at least one of, formatting the data in one of comma-separated values (CSV) format or JavaScript Object Notation (JSON) or translating the language of the data from a first language to a second language.

In some embodiments, the one or more application tools 234 may include, for example, but not be limited to, a Get Related Data tool 246 (e.g., a tool that gives statistics regarding oil and gas field), a Document Search tool 248 (e.g., an unstructured search tool), a Structured Search and Summarization tool 250 (e.g., a tool that searches structured sources, such as the Open Subsurface Data Universe (OSDU) Data Platform, and summarizes the structured data search results), a Document Summarization tool 252 (e.g., a summarization tool for search results from the unstructured search), a Plotting tool 254 (e.g., a visualization tool configure to visualize the results of the structured and/or the unstructured searches), or other specialized tools (e.g., data workspace tools, OSDU related tools, etc.)

In some embodiments, the one or more domain specific tools 236 may include, for example, but not be limited to, a first domain specific tool 260, a second domain specific tool 262, a Log QC tool 264, or other domain specific tools (e.g., advanced tools tailored for specific domains like physics).

In some embodiments, the action node 226 may send the output or result(s) from the selected tool(s) back to the action planning node 220. The action planning node 220 may determine if additional information is required and make one or more subsequent calls to the action node 226 to access additional tools 230 to retrieve the required information. The action node 226 may send the additional output or result(s) from the selected tool(s) back to the action planning node 220 for the action planning node 220 to determine if additional information is required. The action planning node 220 may continue to send calls to the action node 226, the action node 226 may continue to execute one or more tools of the set of tools 230 and send the output from the tools 230 to the action planning node 220 until the action planning node 220 determines that the required information to answer the query has been received.

When the action planning node 220 determines that additional information is not needed (e.g., the data query has been answered), the action planning node 220 may, in some embodiments, send the information retrieved from the tool and agent calling (e.g., multiple tool/call passes to generate responses and logs) to a final node or response synthesis agent 270. The final node 270 may be configured to assimilate the information received from the action planning node 220 to generate a response to the data query.

In some embodiments, the action node 226 may send the information retrieved from the tool and agent calling directly to the final node 270 rather than send the information back to the action planning node 220. For example, in some embodiments, simple queries that can be solved directly by a tool without the need for evaluation by the action planning node 220. In this way, the final node 270 may minimize the number of calls resulting in reduced cost and response time.

Once the final node 270 has assimilated the information to generate the response, in some embodiments, the final node 270 may send the response to a gate Node 272. The gate node 272 may be configured to receive the response and evaluate whether the response generated by action planning node 220 sufficiently addresses the data query. In some embodiments, the gate node 272 may include, or may access, a language model (e.g., LLM or SLM) for determining the sufficiency of the response. In some embodiments, the gate node 272 may be configured to provide a Yes or No determination regarding the sufficiency of the response followed by a concise explanation (e.g., keep concise because the length of output may impact the language model response time, with more verbose replies taking longer response time).

If the gate node 272 determines that the response is sufficient, in some embodiments, the response becomes a final answer 274 which may be presented to an end user (e.g., via a graphical user interface, an electronic report, etc.). If the gate node 272 determines that the response is insufficient, or partially sufficient, in some embodiments, the gate node 272 may provide feedback (e.g., a reason why the response is insufficient) to both query decomposition of the agent planning node 220 and tool calling of the action node 226 to improve the search strategy. In some embodiments, the gate node 272 may send a call back to the action planning node 220 indicating that the user's query has not been answered along with the explanation as to why and instructions for the action planning node 220 to improvise. For example, in some embodiments, the gate node 272 may provide intermediate steps 276 in reasoning (e.g., sequence of tool/agent calls, subqueries from query decomposition, tool calling parameters, etc.) to the action planning node 220 that the action planning node 220 can execute or use as guidance to improvise while continuing to answer or reevaluate the data query.

In some embodiments, the system 200 may include an insight module 280 configured to generate or identify one or more insights or learnings from handling previous data query requests (e.g., from the action plan of the action planning node 220 and/or the intermediate steps 276 from the gate node 272). For example, in some embodiments, at the end of each user request process, the final answer 274 and intermediate steps 276 may be summarized by an agent summarizer node 282 as insights or learnings 284 (e.g., insights related to query decomposition and agent/tool calling). In some embodiments, the insights 284 may be stored in an insight store 286 (e.g., a vector database, a graph database, etc.). The insights 284, in some embodiments, may be utilized for subsequent action planning to improve, for example, query decomposition and agent/tool calling. In some embodiments, the insight module 280 may include an insights synthesis agent 288 configured to synthesize examples and instructions using the one or more insights 284 present in the insights store 286. Those examples and instructions may then be accessed and used by the action planning node 220 for subsequent action planning.

Flowchart for Example Data Query

Figure 3:
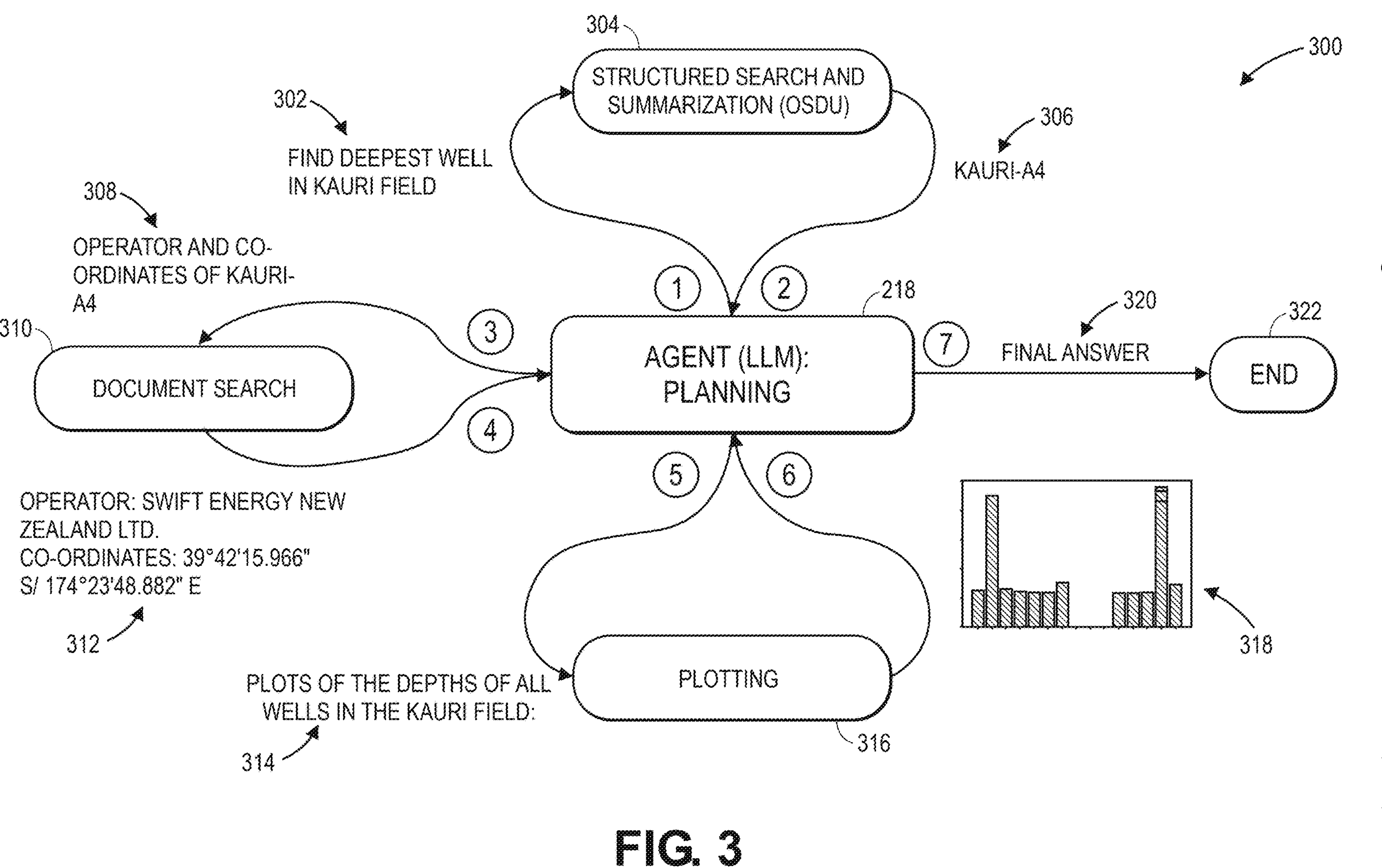
FIG. 3 illustrates an example flow chart for an example data search according to the workflow of FIG. 2, according to an embodiment.
Figure 4:
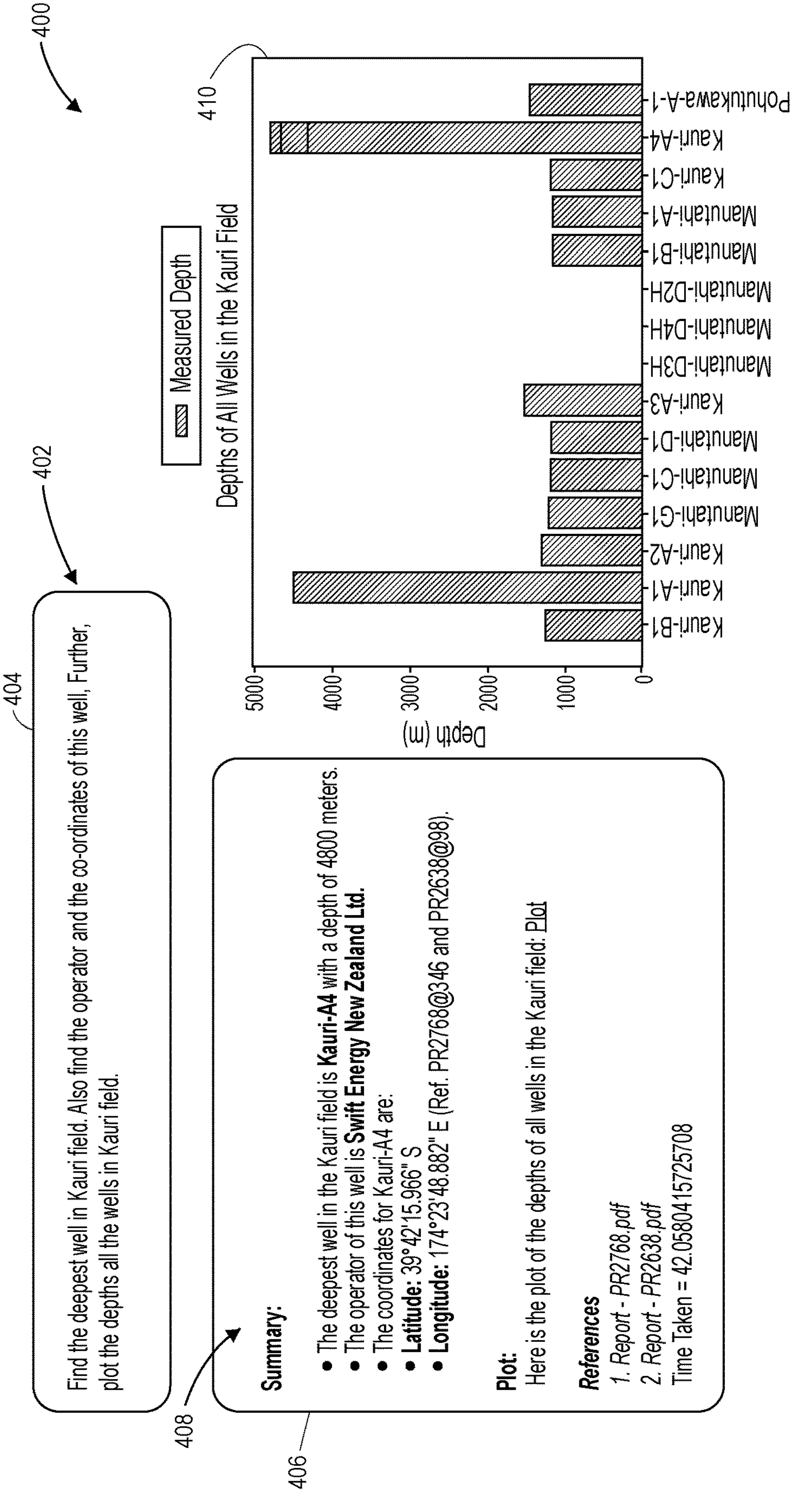
FIG. 4 illustrates an example output of the data search of FIG. 3, according to an embodiment.

FIG. 3 illustrates an example flowchart 300 of an embodiment of the system 200 responding to an example data query. In the illustrated example, the data query includes the natural language query "Find the deepest well in Kauri Field. Also find the operator and the coordinates of this well. Further plot the depths of all the wells in Kauri Field" 402 (FIG. 4). The query may be received by the action module 218 where the action planning node 220 may develop an action plan (e.g., decomposes the query 402 into one or more subqueries and sends calls to the action node 226 to access different agents/tools to solve the one or more subqueries). In the illustrated example, the action planning node 220 identifies the subquery "Find the deepest well in Kauri Field" 302 and the action node 226 calls on the Structured Search and Summarization tool 250 to search the OSDU Data Platform and summarizes results 304 (indicator 1 in FIG. 3). In the illustrated example, the search of the OSDU Data Platform yields the structured search result "Kauri-A4" 306 as the deepest well in the Kauri Field. The structured search result 306 may then be sent to the action module 218 (indicator 2 in FIG. 3).

In the illustrated example, based on structured search result 306, the action planning node 220 may identify the subquery "Who is the operator and what are the coordinates of Kauri A4" 308 and the Action Node 226 may call on the Document Search tool 248 (indicator 3 in FIG. 3) to perform a search of one or more unstructured data sources (e.g., scanned PDFs, Excel Sheets, Power Point Presentations) 310 to answer the subquery 308. In the illustrated example, the search of the one or more unstructured data sources yields the unstructured search result "Operator: Swift Energy New Zealand Ltd. Coordinates: 39"42'15.966" S/174"23'48.882"E" 312 as the deepest well in the Kauri Field. The unstructured search result 312 may then be sent to the action module 218 (indicator 4 in FIG. 3).

In the illustrated example, the action planning node 220 may identify the subquery "Plot the depths of all the wells in the Kauri field" 314 and the Action Node 226 may call on the plotting tool 254 (indicator 5 in FIG. 3) to plot the data 316. The depth of each of the wells in the Kauri field may be gathered, for example, by a call from the Action Node 226 to the Structured Search and Summarization tool 250 to search the OSDU Data Platform for the information and to summarizes the results. In the illustrated example, the plotting tool 316 created an output 318 (e.g., a column chart) illustrating the depths of all of the wells in the Kauri field. The output 318 may then be sent to the action module 218 (indicator 6 in FIG. 3).

As discussed above regarding FIG. 2, in some embodiments, after receiving the results 306, 312, 318 from the executed tools, the action planning node 220 may, in some embodiments, send the information retrieved from the tools and agent calling to a final node or response synthesis agent 270 to assimilate the information to generate a response. From there, in some embodiments the final node 270 may send the response to a gate node 272 to evaluate whether the response generated by action planning node 220 sufficiently addresses the data query. In FIG. 3, the Gate node 272 determines that the response is sufficient, such that the response becomes a final answer 320 which may be presented to an end user 322 (e.g., via a graphical user interface, an electronic report, etc.) (indicator 7 in FIG. 3).

Example Output for Data Query of FIG. 4

FIG. 4 illustrates an example final answer configuration 400 (e.g. display) for presentation to an end user. The final answer configuration 400 may be configured in a variety of ways. For example, in some embodiments, information may be displayed in panes, panels, boxes, windows, etc. In some embodiments, the final answer configuration 400 may present the data query being answered. For example, in FIG. 4, the natural language query 402 may be displayed in a separate pane 404. In some embodiments, the final answer 320 may be displayed in a variety of ways. For example, in FIG. 4, the final answer 320 is displayed in a separate pane 406 and includes a summary 408 of the answers to the query (i.e., name of the deepest well in the Kauri Field, the depth of the well, the name of the operator of the well, and the coordinates of the well in longitude and latitude). In some embodiments, the summary may include additional information, such as for example, the references (e.g., documents, databases, etc.) used to gather the information that constitutes the answer and the time taken to answer the query. In some embodiments, the final answer configuration 400 may also include a graphical representation 410. For example, the example data query of FIG. 3 asked for a plot of the depths of all the wells in the Kauri Field. As shown in FIG. 4, the final answer configuration 400 may include the plot generated by the plot tool 316. Thus, the system may be configured to provide a final answer configuration 400 that provides the information requested, as well as additional useful information (e.g., references), in a simple and concise manner and a variety of formats.

Figure 5:
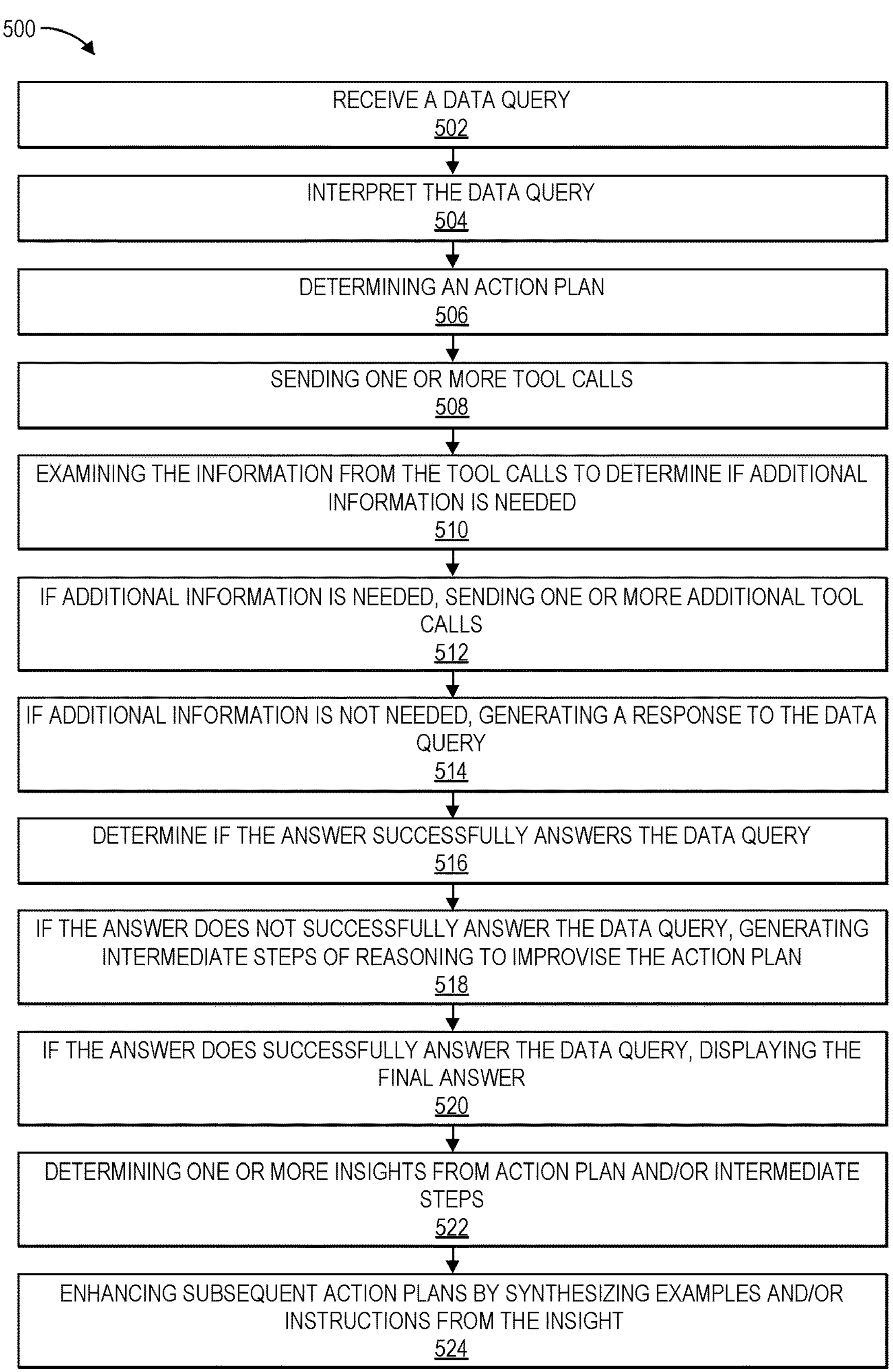
FIG. 5 illustrates an example flow diagram of a method for answering a data query using a language model-based system, according to an embodiment.

Exemplary Method Answering A Data Query With An Agentic Language Model Based System FIG. 5 provides a flow chart of an example method 500 for answering a data query using an agentic language model based system. In some embodiments, the method 500 may include receiving, by an action planning node, a data query 502. The data query may be configured in a variety of ways. In some embodiments, the data query may include at least one of a natural language query, a conversational history, or user context. In some embodiments, the method 500 may include interpreting, by the action planning node, the data query to determine what information is needed to answer the data query 504. In some embodiments, action planning node may include, or can access, at least one of a language model or a domain store of domain centric information.

In some embodiments, the method 500 may include determining, by the action planning node, an action plan for answering the data query 506. In some embodiments, the action plan may include how to decompose the data query into subqueries and what actions are required to obtain the information for each of the sub-queries. In some embodiments, the method 500 may include sending one or more tool calls, by the action planning node, to an action node to execute one or more selected tool from a set of tools 508 in order to retrieve information to answer the subqueries. The selected tools may be configured to perform a variety of tasks, such as, but not limited to, retrieve data from one or more databases, transform the data, run domain interpretation workflows, generate charts on the data, etc.

In some embodiments, the method 500 may include examining the information retrieved from the tools to determine if additional information is needed 510. For example, in some embodiments, the method may include sending the output from the one or more selected tool to the action planning node and the action planning node determining if additional information is needed to answer the data query. If additional information is needed, in some embodiments, the method 500 may include sending one or more additional calls, by the action planning node, to the action node to execute one or more selected tools from the set of tools 512 and sending, by the action node, the output from the one or more selected tools to the action planning node for further determination if additional information is needed.

If the action planning node determines that additional information is not needed, in some embodiments, the method 500 may include assimilating, by a final node 514, the information received from the action planning node 220 to generate a response to the data query. In some embodiments, the method 500 may include sending the response to a gate node to determine, by the gate node, whether the action planning node has successfully answered the data query 516. In some embodiments, the gate node may include, or may access, a language model.

If the gate node determines that the action planning node has not successfully answered the data query, in some embodiments, the method 500 may include sending a call, by the gate node, back to the action planning node with intermediate step of reasoning to improvise the action plan 518. In some embodiments, the intermediate steps may include reasoning regarding query decomposition and/or tool calling. If the gate node determines that the action planning node has successfully answered the data query, in some embodiments, the method 500 may include sending (e.g., displaying) the final answer to an end user 520.

In some embodiments, the method 500 may include determining one or more insights from previous data query requests. For example, in some embodiments, an agent summarizer node may determine one or more insights from the action plan and/or the intermediate steps of reasoning 522. In some embodiments, the one or more insights may be stored into an insights store. In some embodiments, the method 500 may include synthesizing examples and instructions using the one or more insights present in the insights store. In some embodiments, the method 500 may include improving subsequent action planning of the action planning node by utilizing the examples and instructions synthesized from the one or more insights 524.

The method 500 may also include performing an action in response to the final answer, the one or more insights, the subsequent action planning, or a combination thereof. The action may be or include generating and/or transmitting a signal (e.g., using a computing system) that recommends, instructs, and/or causes a physical action to occur at a wellsite. The wellsite action may also or instead include performing the physical action at the wellsite. The physical action may include selecting where to drill a wellbore, drilling the wellbore, varying a weight and/or torque on a drill bit that is drilling the wellbore, varying a drilling trajectory of the wellbore, varying a concentration and/or flow rate of a fluid pumped into the wellbore, or the like.

Example 1

Question: Find details of Kauri-F2 well.

Planning: To get the details of Kauri-F2 well, locate the document information of the well Kauri-F2.

Action: Invoke DocumentSearch tool with query "details of Kauri-F2 well"

Final Answer: Details on Kauri-F2 well are as follows . . . .

Example 2

Question: Find spud year of Kauri well. Find other wells in its field.

Planning: Perform two operations: (1) Find the spud date and (2) get other wells in Kauri well's field. So, two tool calls are used.

Planning: To obtain the spud date and the field information, locate the document information of the well Kauri.

Action: Use DocumentSearch tool.

Observation: Spud date of Kauri well is December 2010. However, no information about the field was found.

Action: Invoke the StructuredSearchSummary tool with query: Find the field of Kauri well.

Observation: The spud date of Kauri well is December 2010 and its field is XYZ. Find the other wells in this field.

Action: Invoke the StructuredSearchSummary tool with query: Find the wells in XYZ field.

Observation: The wells in XYZ field are Kauri, MNO, XUV, LMN.

Final Answer: The spud date of Kauri well is 2010 and other wells in its field XYZ are MNO, XUV, LMN.

Exemplary Computing System

Figure 6:
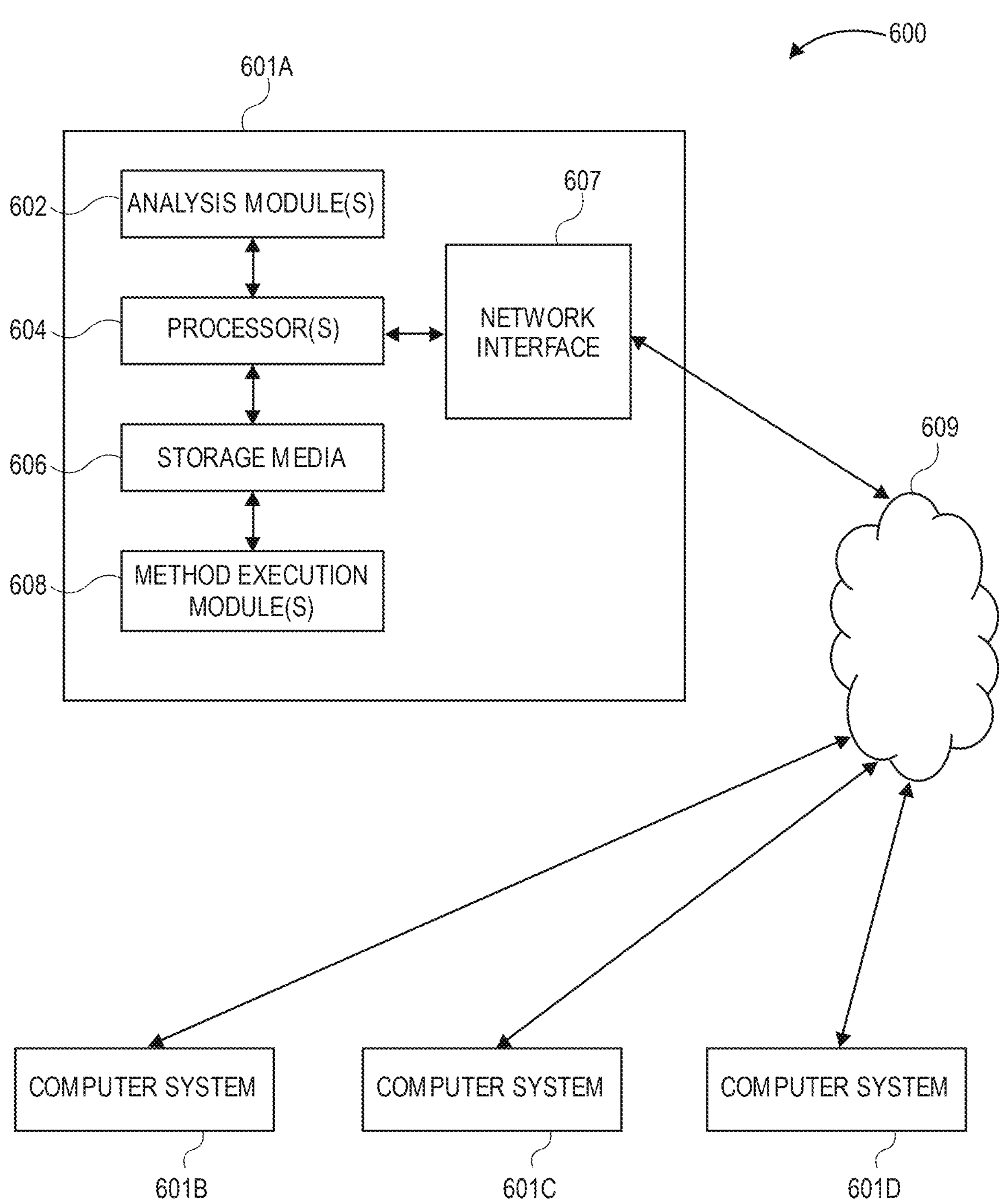
FIG. 6 illustrates a schematic view of a computing system for performing at least a portion of the method(s) described herein, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more method execution module(s) 608. In the example of computing system 600, computer system 601A includes the method execution module 608. In some embodiments, a single method execution module may be used to perform some aspects of one or more embodiments of the methods disclosed herein. In other embodiments, a plurality of method execution modules may be used to perform some aspects of methods herein.

It should be appreciated that computing system 600 is merely one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purposes of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for answering a data query using a language model-based system having a plurality of nodes, the method comprising:

receiving the data query with an action planning node;

interpreting the data query to determine information to answer the data query;

determining an action plan for answering the data query in response to the information, wherein the action plan includes how to decompose the data query into sub-queries and actions to obtain the information for each of the sub-queries;

sending a call from the action planning node to an action node to execute a selected tool from a set of tools in response to the action plan, wherein the selected tool is configured to conduct a search of one or more structured data sources comprising an open subsurface data universe;

sending an output from the selected tool to the action planning node in response to the call;

sending the output from the action planning node to a final node;

synthesizing the output, via the final node, to form a response to the data query; and sending the response to the data query from the final node to a gate node, wherein the gate node is configured to access a language model to:

determine that the response successfully answers the data query; and send a final answer based on the response to an end user in response to determining that the response successfully answers the data query.

2. The method of claim 1, wherein the selected tool includes a workflow configured to retrieve data from one or more databases or documents, transform the data, run domain interpretation workflows based upon the data, or generate charts based upon the data, and wherein the workflow being configured to retrieve data from one or more databases includes retrieving the data from at least one of a relational database, a non-relational database, a graph database, or a vector database.

3. The method of claim 1, wherein the set of tools include a document search tool configured to conduct a search of one or more unstructured data sources, a document summarization tool configured to summarize information within a document, a structured search and summarization tool configured to conduct a search of the one or more structured data sources and summarize search results from the search, a get related data tool configured to determine parent and child entities for a specific record, a plotting tool configured to generate charts from results retrieved from at least one of the search of the one or more structured data sources and the search of the one or more unstructured data sources, and a packaging tool configured to package the search results from the search of the one or more structured data sources.

4. The method of claim 1, wherein the action planning node includes, or is configured to access, at least one of the language model or a domain store of domain centric information, wherein the domain centric information includes at least one of ontological data, knowledge graphs, or vector databases.

5. The method of claim 1, further comprising:

determining, by the action planning node, whether additional information is needed to answer the data query;

in response to determining that additional information is needed, sending one or more additional calls, by the action planning node, to the action node to execute one or more selected tools from the set of tools and sending, by the action node, output from the one or more selected tools to the action planning node.

6. The method of claim 1, further comprising in response to determining that the response has not successfully answered the data query, sending a call, by the gate node, back to the action planning node with intermediate steps of reasoning to improvise the action plan comprising query decomposition and tool calling and gather different or additional data.

7. The method of claim 6, wherein the intermediate steps in reasoning include at least one of a sequence of tools calls, one or more subqueries from query decomposition, or one or more input arguments to one or more tools from the set of tools.

8. The method of claim 6, further comprising:

receiving, by an agent summarizer node, the intermediate steps in reasoning;

determining, by the agent summarizer node, one or more insights from the intermediate steps of reasoning;

storing the one or more insights into an insights store; and enhancing the action planning node by synthesizing examples and instructions using the one or more insights from the insights store.

9. The method of claim 8, wherein the one or more insights includes one or more of: outcomes from tool calls, query decomposition, or tool input arguments.

10. A computing system, comprising:

one or more processors; and a memory system comprising one or more non-transitory computer-readable media storing instructions that, when executed by at least one of the one or more processors, cause the computing system to perform operations, the operations comprising:

receiving a data query with an action planning node, wherein the data query includes at least one of a natural language query, a conversational history, or user context;

interpreting the data query to determine information to answer the data query;

determining an action plan for answering the data query in response to the information, wherein the action plan includes how to decompose the data query into sub-queries and actions to obtain the information for each of the sub-queries;

sending a call from the action planning node to an action node to execute a selected tool from a set of tools in response to the action plan, wherein the selected tool includes a workflow configured to retrieve data from one or more databases or documents, transform the data, run domain interpretation workflows based upon the data, and/or generate charts based upon the data, and wherein the selected tool is configured to conduct a search of one or more structured data sources comprising an open subsurface data universe;

sending an output from the selected tool to the action planning node in response to the call;

sending the output from the action planning node to a final node;

synthesizing the output, via the final node, to form a response to the data query;

sending the response to the data query from the final node to a gate node, wherein the gate node includes, or is configured to access, a language model to:

determine that the response successfully answers the data query; and send a final answer based on the response to an end user in response to determining that the response successfully answers the data query; and in response to sending the final answer based on the response to the end user, generating one or more signals, via the computing system, to instruct a physical action to occur at a wellbore, wherein the physical action comprises selecting where to drill a wellbore, drilling the wellbore, varying a weight and/or torque on a drill bit that is drilling the wellbore, varying a drilling trajectory of the wellbore, or varying a concentration and/or flow rate of a fluid pumped into the wellbore.

11. The computing system of claim 10, wherein the operations further comprise sending a call, by the gate node, back to the action planning node with intermediate steps of reasoning to improvise the action plan comprising query decomposition and tool calling and gather different or additional data.

12. The computing system of claim 11, wherein the operations further comprise:

receiving, by an agent summarizer node, the intermediate steps of reasoning;

determining, by the agent summarizer node, one or more insights from the intermediate steps of reasoning;

storing the one or more insights into an insights store; and enhancing the action planning node by synthesizing examples and instructions using the one or more insights from the insights store.

13. The computing system of claim 12, wherein the one or more insights includes one or more of: outcomes from tool calls, query decomposition, or tool input arguments.

14. The computing system of claim 13, wherein the intermediate steps in reasoning include at least one of a sequence of tools calls, one or more subqueries from query decomposition, or one or more input arguments to one or more tools from the set of tools.

15. The computing system of claim 10, wherein the set of tools include one or more of a document search tool configured to conduct a search of one or more unstructured data sources, a document summarization tool configured to summarize information within a document, a structured search and summarization tool configured to conduct a search of a structured data repository and summarize search results from the search, a get related data tool configured to determine parent and child entities for a specific record, a plotting tool configured to generate charts from results retrieved from at least one of the search of the structured data repository and the search of the one or more unstructured data sources, or a packaging tool configured to package the search results from the search of the structured data repository.

16. The computing system of claim 10, wherein the action planning node includes, or can access, at least one of the language model or a domain store of domain centric information, wherein the domain centric information includes at least one of ontological data, knowledge graphs, or vector databases.

17. A non-transitory computer-readable medium storing instructions that, when executed by one or more processors of a computing system, cause the computing system to perform operations, the operations comprising:

receiving a data query with an action planning node, wherein the data query includes at least one of a natural language query, a conversational history, or user context;

interpreting the data query to determine information to answer the data query;

determining an action plan for answering the data query in response to the information, wherein the action plan includes how to decompose the data query into sub-queries and actions to obtain the information for each of the sub-queries;

sending a call from the action planning node to an action node to execute a selected tool from a set of tools in response to the action plan, wherein the selected tool includes a workflow configured to retrieve data from one or more databases or documents, transform the data, run domain interpretation workflows based upon the data, and/or generate charts based upon the data;

sending an output from the selected tool to the action planning node in response to the call;

synthesizing the output to form a response to the data query with a final node;

sending the response to the data query to a gate node;

determining, by the gate node, that the response does not successfully answer the data query, wherein the gate node includes, or is configured to access, a language model; and sending a second call, by the gate node, back to the action planning node with intermediate steps of reasoning to improvise the action plan comprising query decomposition and tool calling and gather different or additional data, wherein the intermediate steps of reasoning comprise sending one or more additional calls to the action planning node for the action planning node to execute while determining a new action plan for answering the data query.

18. The non-transitory computer-readable medium of claim 17, wherein the operations further comprise:

receiving, by an agent summarizer node, the intermediate steps of reasoning;

determining, by the agent summarizer node, one or more insights from the intermediate steps of reasoning;

storing the one or more insights into an insights store; and enhancing the action planning node by synthesizing examples and instructions using the one or more insights from the insights store.

19. The non-transitory computer-readable medium of claim 18, wherein the one or more insights includes one or more of: outcomes from tool calls, query decomposition, or tool input arguments.

20. The non-transitory computer-readable medium of claim 17, wherein the workflow configured to retrieve data from one or more databases includes retrieving data from at least one of a relational database, a non-relational database, a graph database, or a vector database.

* * * * *